United States Patent [19]

Hess et al.

[11] Patent Number: 5,286,831
[45] Date of Patent: Feb. 15, 1994

[54] AT LEAST SUBSTANTIALLY PORE-FREE POLYURETHANE MOLDING COMPOUNDS

[75] Inventors: Bernhard Hess, Moers; Klaus Prater, Krefeld; Heinrich Heine, Leverkusen; Joachim Franke, Cologne; Hans-Dieter Jakob, Leverkusen, all of Fed. Rep. of Germany

[73] Assignee: Bayer Aktiengesellschaft, Leverkusen, Fed. Rep. of Germany

[21] Appl. No.: 434,042

[22] Filed: Nov. 9, 1989

[30] Foreign Application Priority Data

Nov. 22, 1988 [DE] Fed. Rep. of Germany ....... 3839334

[51] Int. Cl.$^5$ ............................................. C08G 18/06
[52] U.S. Cl. ..................... 528/49; 524/871; 524/875; 528/74.5; 528/81
[58] Field of Search ............. 528/49, 74.5, 75, 76, 528/81; 524/871, 875

[56] References Cited

U.S. PATENT DOCUMENTS

| | | | |
|---|---|---|---|
| 2,994,674 | 8/1961 | Rudkin et al. | 200/18 |
| 3,546,148 | 12/1970 | Diamond et al. | 260/18 |
| 4,677,181 | 6/1987 | Höhlein et al. | 528/74.5 |
| 4,814,410 | 3/1989 | Höhlein et al. | 528/74.5 |
| 4,868,224 | 9/1989 | Harasin et al. | 521/124 |

FOREIGN PATENT DOCUMENTS

| | | |
|---|---|---|
| 1900867 | 7/1969 | Fed. Rep. of Germany . |
| 821368 | 10/1959 | United Kingdom . |
| 953357 | 3/1964 | United Kingdom . |
| 1391066 | 4/1975 | United Kingdom . |

OTHER PUBLICATIONS

Becker/Braun, Kunststoff-Handbuch, vol. VII, Polyurethane, 1983, pp. 410–425, (English Version Submitted–pp. 388–405) pp. 86–87, (English Version Submitted–p. 85).

*Primary Examiner*—John Kight, III
*Assistant Examiner*—Shelley A. Dodson
*Attorney, Agent, or Firm*—Joseph C. Gil; Thomas W. Roy; N. Denise Brown

[57] ABSTRACT

The present invention directed to an at least substantially pore-free polyurethane prepared by reacting at least one polyisocyanate and a component containing a partial carboxylic acid ester which is the reaction product of a carboxylic acid and an at least trihydric alcohol in quantities such that at least one of the hydroxyl groups of said alcohol is not esterified.

13 Claims, No Drawings

AT LEAST SUBSTANTIALLY PORE-FREE POLYURETHANE MOLDING COMPOUNDS

BACKGROUND OF THE INVENTION

1. Field of the Invention

This invention is directed to polyurethane molding compounds (PUR compounds) which are pore-free or at least substantially pore-free.

2. Description of the Invention

The production of casting resins, for example for the electrical field, by the reaction of organic polyisocyanates with polyhydroxyl compounds is known (cf. for example Kunststoff-Handbuch, Vol. VII, "Polyurethane", by Becker/Braun, Carl Hanser Verlag Munchen, Wien (1983), pages 410 to 425). Moldings produced in this way which are suitable for use as insulators in the electrical industry, have to be basically pore-free and foam-free, so that particular importance is also attributed in the prior art to the careful degassing and drying of the starting materials, particularly the polyhydroxyl compounds. In general, water-absorbing agents such as (anhydrous) zeolites, are added to the reaction mixtures in order safely to prevent bubble formation produced by the reaction of isocyanate groups with water which is accompanied by the evolution of carbon dioxide. On the other hand, the presence of water during hardening is unavoidable in certain applications, for example in the case of cable jointing compounds, which have to be processed in the open, even in poor weather conditions. In this case, pronounced foaming occurs in the case of standard PUR casting compounds based on usual polyetherpolyols with the result that the insulating effect of the casting resin is seriously impaired, even when measures are taken to ensure that the starting materials are free from water by storing the starting materials in the absence of atmospheric moisture and adding water-absorbing agents.

Foaming does not occur when castor oil is used instead of polyether polyols. However, this natural product is subject to considerable quality fluctuations and, in addition, PUR molding compounds based on this polyester polyol are extremely vulnerable to hydrolysis whenever the hardened molding material comes into contact with moisture. Another disadvantage of compounds based on castor oil is that they turn brittle during prolonged storage and relatively high temperatures (above 50° C.). The casting resin compounds gradually develop cracks which adversely affect their electrical insulating power.

Glass-fiber-containing laminates of polyisocyanates and commercially available polyether polyols are porous and hence unusable. Bubble formation cannot be prevented even by careful drying of the glass fibers and polyether polyols or by the addition of water-absorbing agents.

Fatty acid-modified polyisocyanates and fatty acid-modified polyurethanes are also described as paint binders in the literature (Kunststoff Handbuch, No. 7, Polyurethane, 1983, pages 86, 87). These binders are solid resins or resins of very high viscosity which are dissolved in paint solvents and applied in this form. Due to their solvent content, they are unsuitable for the production of polyurethane resin molding materials in accordance with the present invention using low viscosity, solvent-free components.

Accordingly, an object of the present invention is to provide an improved process for the production of pore-free polyurethane molding compounds which, in particular, are also suitable for processing together with fibers, particularly glass fibers.

SUMMARY OF THE INVENTION

The present invention directed to an at least substantially pore-free polyurethane prepared by reacting at least one Polyisocyanate I and a component P containing a partial carboxylic acid ester which is the reaction product of a carboxylic acid C and an at least trihydric alcohol A in quantities such that at least one of the hydroxyl groups of said alcohol is not esterified.

DETAILED DESCRIPTION OF THE INVENTION

In a preferred embodiment, A is an alcohol Al having a molecular weight of 92 to 500, preferably 92 to 250. In another preferred embodiment, the carboxylic acid C is an acid containing from 6 to 24 carbon atoms, preferably a fatty acid.

In particularly preferred embodiment, the polyol P has an acid value below 10, an OH value above 100 and a fatty acid content of about 0.15 to 0.5 mol per 100 g polyol P.

The alcohols A are preferably polyhydric aliphatic alcohols Al containing primary and/or secondary hydroxyl groups, optionally in admixture with small quantities of dihydric alcohols such as ethylene glycol, di- or triethylene glycol, 1,2- or 1,3-dihydroxypropane, the various isomeric butane diols, particularly 1,4-dihydroxy-butane, and the various isomeric hexane diols, in particular hexane-1,6-diol. Preferred alcohols A are glycerol, trimethylolpropane, pentaerythritol, sorbitol and mannitol. In one particularly preferred embodiment of the process according to the invention, trimethylolpropane is used. It is also possible to use alkoxylation products A2, i.e., derivatives containing ether groups of the polyhydric alcohols Al mentioned above and having a molecular weight of 224 to 850. The alcohols Al used to prepare these derivatives preferably have a molecular weight of 92 to 250.

Preferred carboxylic acids C are $C_6$–$C_{24}$ fatty acids which may also contain double bonds such as hexanoic, heptanoic, octanoic, nonanoic, decanoic, dodecanoic, hexadecanoic or octadecanoic acid in branched or unbranched form, or fatty acid mixtures obtained from natural oils such as the known fatty acid mixtures of soybean oil, castor oil, coconut oil, safflower oil, sunflower oil, tall oil or peanut oil.

In a preferred embodiment, 1 to 2 moles of carboxylic acid C, particularly a fatty acid, is esterified per mole of alcohol A.

The polyols P may also be prepared by transesterification of natural oils with additional polyols, optionally using standard transesterification catalysts.

Since the polyols P to be used in accordance with the invention accumulate in the form of clear or clouded, free-flowing or semisolid to solid compounds (depending upon the type and quantity of fatty acid used), which dissolve readily in commercially available liquid polyether or polyester polyols. They are preferably used in the form of such mixtures in quantities such that the mixtures may contain up to about 50% by weight, based on the weight of the mixtures, of these liquid polyether or polyester polyols. Other alcohols, such as trimethylol ethane or propane, pentaerythritol, sorbitol or mannitol, may be dissolved in small quantities in these mixtures.

In one particularly preferred embodiment, the polyols P are obtained by the reaction of the carboxylic acid C with an alcohol A1 having a molecular weight of 92 to 250, the resulting polyol P being dissolved in an alkoxylation product A2 having a molecular weight of 224 to 850 and based on an alcohol A1 having a molecular weight of 92 to 250.

An alkoxylation product A2 having an OH value above 200 is preferably used in mixtures such as these. In one particularly preferred embodiment, the mixture of P and A2 has an OH value of about 150 to 650 and a fatty acid content of about 0.1 to 0.4 moles per 100 g of the mixture of P and A2.

Of the commercially available polyester and polyether polyols, which are described in Kunststoff-Handbuch, Vol. 7, "Polyurethane", pages 15, 42, 55 et seq, those having an OH value above 200 are preferred. Examples of polyester and polyether polyols such as these are tris-hydroxypropyl trimethylol propane, tris-hydroxyethyl trimethylol propane, phthalic acid bis-diethylene glycol ester and others of technical quality. Those having lower OH values, such as castor oil, may also be added in small quantities.

The mixtures according to the invention of the polyols P with commercially available polyester or polyether polyols and, optionally, dissolved alcohols also preferably have OH values of about 150 to 650 and a fatty acid content of about 0.1 to 0.4 moles per 100 g polyol mixture.

The polyisocyanates I are any organic polyisocyanates of the type known per se from polyurethane chemistry. Suitable polyisocyanates include aliphatic, cycloaliphatic, araliphatic, aromatic and heterocyclic polyisocyanates of the type described, for example, by W. Siefken in Justus Liebigs Annalen der chemie, 562, pages 75 to 136, more especially those corresponding to the formula $$Q(NCO)_n,$$

wherein n=2-4, preferably 2, and

Q is an aliphatic hydrocarbon radical containing 2 to 18, preferably 6 to 10 carbon atoms, a cycloaliphatic hydrocarbon radical containing 4 to 15, preferably 5 to 10 carbon atoms, an aromatic hydrocarbon radical containing 6 to 15, preferably 6 to 13 carbon atoms or an araliphatic hydrocarbon radical containing 8 to 15, preferably 8 to 13 carbon atoms.

Preferred polyisocyanates I include 4,4'-diisocyanatodiphenyl methane and technical mixtures thereof with 2,4'- and, optionally, 2,2'-diisocyanatodiphenyl methane; polyisocyanate mixtures of the diphenyl methane series which may be obtained by the phosgenation of aniline/formaldehyde condensates and which, in addition to the diisocyanates mentioned, contain varying quantities of higher homologs; 2,4-diisocyanatotoluene and technical mixtures thereof with up to 35% by weight, based on the mixture, of 2,6-diisocyanatotoluene; hexamethylene diisocyanate; 1-isocyanato-3,3,5-trimethyl-5-isocyanatomethyl cyclohexane (isophorone diisocyanate); urethane-, carbodiimide-, isocyanurate-, allophanate- or bioret-modified polyisocyanates based on the unmodified polyisocyanates mentioned above; and mixtures of these polyisocyanates. The polyisocyanates are preferably liquid at room temperature. It is particularly preferred to use the phosgenation products of aniline/formaldehyde condensates as the organic polyisocyanate I.

To produce the molding compounds, the polyols P or the described mixtures thereof with polyester or polyether polyols are mixed with the polyisocyanates and the resulting mixture is preferably impregnated with a mixture of glass fiber is mats or cloths. The equivalent ratio of isocyanate groups to hydroxyl groups is generally about 0.75:1 to 1.25:1, preferably about 0.9:1 to 1.1:1.

If desired, additives may be incorporated into the molding compounds such as (anhydrous) zeolites in quantities of up to about 5% by weight, based on the mixture; fillers such as mineral powder, short glass fibers, polyethylene powder or other inorganic or organic fillers; and known pigments or accelerators.

The molding compounds generally have a pot life of about 0.25 to 10 hours at room temperature and harden in about 2 to 24 hours at room temperature to form pore-free plastics, the pot life and hardening time being determined in particular by the presence or absence of accelerators for the isocyanate polyaddition reaction. If desired, this time may be considerably shortened by increasing the temperature.

The molding compounds according to the invention are suitable as encapsulating compounds in the electrical industry for the production of insulators and especially for the production of glass fiber-containing laminates and filled or unfilled coatings.

The invention is illustrated by the following examples and comparison examples.

| Definitions of the abbreviations used: | |
|---|---|
| TMP: | Trimethylolpropane |
| Poly-EO 1: | Polyether polyol of TMP and propylene oxide, OH value: 550 |
| Poly-EO 2: | Polyether polyol of TMP and propylene oxide, OH value: 380 |
| Poly-IC 1: | Diphenyl methane diisocyanate, technical isomer mixture; NCO content: 30 to 32%, viscosity (25° C.): 110 mPa · s |
| Poly-IC 2: | Diphenylmethane diisocyanate, technical isomer mixture; NCO content: 30 to 32%, viscosity (25° C.): 200 mPa · s |
| Poly-IC 3: | Distilled diphenyl methane diisocyanate,; isomer mixture; NCO content: 33%, viscosity (25° C.): 15 mPa · s |
| Poly-IC 4: | Prepolymer based on isophorone diisocyanate and propoxylated trimethylolpropan containing free NCO groups, NCO content: 33%, viscosity (25° C.): 100 mPa · s |
| Poly-IC 5: | Prepolymer based on diphenylmethane diisocyanate and polypropoxylated bisphenol A containing free NCO groups, NCO content: 25%, viscosity (25° C.): 550 mPa · s. |
| Baylith paste: | Zeolite made into a paste with castor oil (1:1) |

Preparation of Polyols A to D used in Accordance with the Invention:

The esterification components listed in Table I were weighed together into a stirred flask surmounted by a descending distillation column and were esterified under nitrogen at 220° C. until the characteristic data indicated had been reached. Polyol D was prepared by transesterification at 260° C.

TABLE I

| Polyol: | (Quantities in g) | | | |
|---|---|---|---|---|
| | A | B | C | D |
| TMP | 134 | — | 134 | 134 |
| Glycerol | — | 92 | — | — |
| Soybean oil fatty acid | 222 | 278 | — | — |
| Isononanoic acid | 32 | — | 95 | — |
| Peanut oil fatty acid | — | — | 168 | — |
| Soybean oil | — | — | — | 439 |
| Acid value (mg KOH/g) | 2 | 1 | 2 | 0 |
| OH value, acetyl (mg KOH/g) | 320 | 296 | 285 | 274 |
| Visc. (20°), mPa · s | 250 | 314 | 369 | 351 |

Production of Laminates from the Polyols and Polyisocyanates According to the Invention (Examples and Comparisons)

390 g/m² glass fiber cloths (type 92140, Interglass-/Ulm) were used for the production of laminates. Preparation of the laminates:

In a polyethylene beaker, the polyols shown in Table II were thoroughly mixed with Baylith paste after which the indicated quantities of diisocyanate were stirred in until a visible change in color from light beige to dark brown indicated compatibility.

Part of the mixture was cast onto a glass plate (20×20 cm), which had previously been coated with a release agent (wax), and spread with a brush. The first layer of glass fiber cloth was then placed on this first resin layer, pressed on with a knife and deaerated. Complete wetting and impregnation of the glass fiber cloth was achieved by casting on more resin and dabbing with a brush. This procedure was repeated several times, so that laminates containing 3 to 5 layers of glass fiber cloth were formed. Hardening took place over 24 hours at room temperature. The optical evaluation of the laminates after this time and also the glass temperature (DSC method according to DIN 51 005) are shown in Table II.

Table II demonstrates that pore-free, hard laminates can only be obtained when the polyols according to the invention are used. The comparison examples only result in foamed laminates.

TABLE II

| Example | Polyol | pbw* polyol | pbw* Baylith-Paste | Polyisocyanate | pbw* polyisocyanate | Evaluation of the laminates after 24 h at room temperature | TG (DSC) |
|---|---|---|---|---|---|---|---|
| 1 | D | 100 | 10 | IC 1 | 72 | Satisfactory, hard and tough, thoroughly impregnated | |
| 2 | A | 100 | 10 | IC 1 | 77 | Satisfactory, hard, thoroughly impregnated | 60° C. |
| 3 | C | 100 | 10 | IC 1 | 71 | Satisfactory, tough, hard, thoroughly, impregnated | |
| 4 | B | 100 | 10 | IC 1 | 48 | Satisfactory, tough, slow hardening | |
| 5 | A<br>EO 1 | 90<br>10 | 10 | IC 1 | 83 | Satisfactory, hard, thoroughly impregnated | 69° C. |
| 6 | A<br>EO 1 | 80<br>20 | 10 | IC 1 | 89 | Satisfactory, hard, thoroughly impregnated | 62° C. |
| 7 | A<br>EO 1 | 70<br>30 | 10 | IC 1 | 95 | Satisfactory, hard, thoroughly impregnated | 66° C. |
| 8 | A<br>EO 2 | 90<br>10 | 10 | IC 1 | 79 | Satisfactory, tough and hard, thoroughly, impregnated | 68° C. |
| 9 | A<br>EO 2 | 80<br>20 | 10 | IC 1 | 81 | Satisfactory, tough and hard, thoroughly impregnated | 76° C. |
| 10 | A<br>EO 2 | 70<br>30 | 10 | IC 1 | 82 | Satisfactory, tough and hard, thoroughly impregnated | 62° C. |
| 11 | A | 100 | 10 | IC 3 | 77 | Satisfactory, tough and hard, thoroughly impregnated | |
| 12 | A | 100 | 10 | IC 5 | 95 | Satisfactory, tough and hard, thoroughly impregnated | 54° C. |
| 13 | A | 100 | 10 | IC 2 | 77 | Satisfactory, hard, thoroughly impregnated | |
| Comparison Tests: | | | | | | | |
| C1 | EO 2 | 100 | 10 | IC 1 | 100 | Highly foamed, | |

TABLE II-continued

| Example | Polyol | pbw* polyol | pbw* Baylith-Paste | Polyisocyanate | pbw* polyisocyanate | Evaluation of the laminates after 24 h at room temperature | TG (DSC) |
|---|---|---|---|---|---|---|---|
| C2 | EO 1 | 100 | 10 | IC 1 | 137 | porous, hard Highly foamed, porous, hard | |

*pbw = parts by weight

Production of Laminate Plates for Mechanical Testing:

Preparation was carried out as described above, except that a polished iron plate, which was covered by a release film and on which a frame of 4 mm thick iron bars as spacers was arranged, was used as the base. A laminate of 14 layers of glass fiber cloth was covered by a cover film and the entrained air and excess resin were removed by rolling. The laminate was covered with a second, polished iron plate and left to harden under pressure for 4 to 5 hours at room temperature. Testing was carried out after 7 days; test specimens were cut out for this purpose. The data shown in Table III were determined on the test specimens.

TABLE III

| Formulation | Example 14 | Example 15 |
|---|---|---|
| Polyol A | 100 pbw* | 70 pbw* |
| Poly-EO 1 | — | 30 pbw |
| Baylith ® paste | 10 pbw | 10 pbw |
| Poly-IC 1 | 77 pbw | 95 pbw |
| Cobalt octoate solution (8% Co metal) | 0.1 pbw | — |
| Glass content (% by weight) | 72.5 | 69.5 |
| Flexural strength (N/mm$^2$) | 239 | 307 |
| E modulus (N/mm$^2$) | 15012 | 16915 |
| Tensile strength (N/mm$^2$) | 354 | 320 |
| Impact strength (KJ/m$^2$) | 145 | 129 |

*pbw = parts by weight

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An at least substantially pore-free polyurethane which is prepared by reacting at least one polyisocyanate, and a component comprising a partial carboxylic acid ester which is the reaction product of a carboxylic acid and an at least trihydric alcohol which is free from ether groups in quantities such that at least one of the hydroxyl groups of said alcohol is not esterified.

2. The polyurethane of claim 1 wherein said alcohol has a molecular weight of 92 to 500.

3. The polyurethane of claim 1 wherein said alcohol comprises a member selected from the group consisting of glycerol, trimethylol propane, pentaerythritol, sorbitol and mannitol.

4. The polyurethane of claim 1 wherein said carboxylic acid contains 6 to 24 carbon atoms.

5. The polyurethane of claim 1 wherein said partial carboxylic acid ester has an acid value below 10, an OH value above 100 and a fatty acid content of about 0.15 to 0.5 moles per 100 g of said partial carboxylic acid ester.

6. The polyurethane of claim 1 wherein said component comprises a mixture of said partial carboxylic acid ester and a polyether polyol having an OH value above 200 and obtained by alkoxylating a polyol having at least three hydroxyl groups and a molecular weight of 92 to 250 with an alkylene oxide.

7. The polyurethane of claim 6 wherein said mixture has an OH value of about 150 to 650 and a fatty acid content of about 0.1 to 0.4 moles per 100 g of said mixture.

8. The polyurethane of claim 1 wherein said polyurethane additionally contains glass fibers.

9. An at least substantially pore-free polyurethane which is prepared by reacting at least one polyisocyanate and a component comprising a partial carboxylic acid ester which has an acid value below 10, an OH value above 100 and a fatty acid content of about 0.15 to 0.5 moles per 100 g of said partial carboxylic acid ester and is the reaction product of
i) a carboxylic acid containing 6 to 24 carbon atoms and
ii) an at least trihydric alcohol which is free from ether groups and having a molecular weight of 92 to 500, in quantities such that at least one of the hydroxyl groups of said alcohol is not esterified.

10. The polyurethane of claim 9 wherein said alcohol comprises a member selected from the group consisting of glycerol, trimethylol propane, pentaerythritol, sorbitol and mannitol.

11. The polyurethane of claim 9 wherein said component comprises a mixture of said partial carboxylic acid ester and a polyether polyol having an OH value above 200 and obtained by alkoxylating a polyol having at least three hydroxyl groups and a molecular weight of 92 to 250 with an alkylene oxide.

12. The polyurethane of claim 11 wherein said mixture has an OH value of about 150 to 650 and a fatty acid content of about 0.1 to 0.4 moles per 100 g of said mixture.

13. The polyurethane of claim 9 wherein said polyurethane additionally contains glass fibers.

* * * * *